United States Patent
Nield et al.

[15] 3,666,720
[45] May 30, 1972

[54] VINYL CHLORIDE COPOLYMERS

[72] Inventors: Eric Nield, Waton-At-Stone; John Brewster Rose, St. Albans, both of England

[73] Assignee: Imperial Chemical Industries Limited, London, England

[22] Filed: Aug. 11, 1970

[21] Appl. No.: 63,011

Related U.S. Application Data

[63] Continuation of Ser. No. 696,122, Jan. 8, 1968, abandoned, which is a continuation-in-part of Ser. No. 374,181, June 10, 1964, abandoned.

[30] Foreign Application Priority Data

June 18, 1963 Great Britain.....................24,223/63

[52] U.S. Cl...............260/47 UA, 260/17 A, 260/23 XA, 260/29.6 TA, 260/29.6 RW, 260/32.6 N, 260/32.8 N, 260/33.4 R, 260/33.6 UA, 260/33.8 UA, 260/41 R, 260/78 UA, 260/884, 260/890, 260/895
[51] Int. Cl............................................C08g 20/00
[58] Field of Search.........................260/78 UA, 47 U

[56] References Cited

UNITED STATES PATENTS

| 2,342,295 | 2/1944 | Orthner et al.............260/78 UA |
| 2,384,239 | 9/1945 | Dorough...................260/78 UA |
| 2,650,215 | 8/1953 | Strain.......................260/78 UA |
| 2,743,260 | 4/1956 | Tawney.....................260/78 UA |
| 2,403,960 | 7/1946 | Stoops et al...............260/78 UA |
| 3,352,832 | 11/1967 | Barr et al..................260/78 UA |

Primary Examiner—Harold D. Anderson
Attorney—Cushman, Darby & Cushman

[57] ABSTRACT

Improved thermoplastic materials are provided which are polymeric products comprising from 99 to 1 percent by weight of vinyl chloride units, from 1 to 90 percent by weight of N-aryl maleimide units and from 0 to 49 percent by weight of units derived from at least one other copolymerisable ethylenically unsaturated compound. Very interesting materials are obtained when the said compound comprises not more than 20 percent by weight of the polymeric product. The preferred products contain from 60 to 99 percent by weight of vinyl chloride residues, from 1 to 40 percent by weight of N-aryl maleimide residues and 0 to 20 percent by weight of residues derived from the other monoethylenically unsaturated compound.

7 Claims, No Drawings

VINYL CHLORIDE COPOLYMERS

This application is a continuation of our application Ser. No. 696,122 filed on Jan. 8, 1968, which is a continuation-in-part of our application Ser. No. 374,181 filed on June 10, 1964, both now abandoned.

The present invention relates to new polymeric products, particularly those derived by polymerizing together N-substituted maleimides and vinyl chloride.

According to the present invention we provide a new class of thermoplastic materials which are polymeric products comprising from 99 to 1 percent by weight of vinyl chloride units, from 1 to 99 percent by weight of N-aryl maleimide units and from 0 to 49 percent by weight of units derived from at least one other copolymerizable ethylenically unsaturated compound. Very interesting materials are obtained when the said compound comprises not more than 20 percent by weight of the polymeric product.

These products are thermoplastic, strong and insensitive to water and often more stable to degradation at elevated temperatures than homopolymers of vinyl chloride. Those of our specified products which comprise vinyl chloride in major amounts together with N-aryl maleimide residues alone or with residues of a third monomer whose homopolymer has a softening point at least equal to that of a polyvinyl chloride of comparable molecular weight have most of the properties normally associated with vinyl chloride resins but in addition have usefully increased softening points, often of an order sufficient to allow continuous contact with boiling water without serious distortion. Furthermore, this improvement is achieved without any substantial increase in water-sensitivity and little, if any, deterioration in thermal stability.

It will be appreciated that the nature of the product will be determined at least in part by the relative proportions of the component monomers and that a wide variety of novel thermoplastic materials are obtainable. However, while the product may contain as little as 1 percent by weight of vinyl chloride or the N-aryl maleimide or as much as 99 percent by weight of either monomer or as much as 49 percent by weight of a third monomer copolymerisable with the other two, where it is intended to be a modified form of polyvinyl chloride and moldable or otherwise shapeable in much the same way as polyvinyl chloride we prefer the proportion of vinyl chloride present to be not less than 60 percent by weight. On the other hand, in order to obtain a useful increase in softening point where such is desired, we prefer the product to contain at least 1 percent by weight of N-aryl maleimide. The third component in such cases is preferably present in amounts of not more than 20 percent by weight. Thus, the preferred products contain from 60 to 99 percent by weight of vinyl chloride residues, from 1 to 40 percent by weight of N-aryl maleimide residues and 0 to 20 percent of residues derived from any other monoethylenically unsaturated compound copolymerisable with both the vinyl chloride and the N-aryl maleimide, the quantities to total 100 percent. We have found that, as a general rule, as the N-aryl maleimide content is increased, the tensile yield stress is increased but the ease of moulding is decreased. In order to get the best combination of good moulding properties and high tensile strength, we further prefer products containing from 70 to 90 percent by weight of vinyl chloride residues, 10 to 30 percent by weight of N-aryl maleimide residues and 0 to 20 percent by weight of residues derived from other monomers copolymerizable with both vinyl chloride and N-aryl maleimide, the quantities to total 100 percent.

By an N-aryl maleimide we mean a compound notionally derived by replacing the hydrogen atom attached to the imide nitrogen atom of maleimide by a monovalent aromatic radical. The monovalent aromatic radical may be derived from a wholly aromatic hydrocarbon which is unsubstituted, e.g., benzene, diphenyl or naphthalene or in which one or more of the hydrogen atoms has or have been replaced by other monovalent atoms of groups; for instance, halogen atoms (e.g., chlorine, bromine, fluorine), hydroxyl groups, nitro groups, alkyl, aralkyl and cycloalkyl groups (particularly those containing up to four aliphatic carbon atoms) and groups having the structure —NH$_2$, —NHR, —NRR', —OR, —CN, —MOR, —SR, —COOR, —COOH, —OCOR, —NHCOR and —CONHR where M is a divalent aliphatic hydrocarbon radical, e.g., alkylene, and R and R' are each monovalent hydrocarbon radicals for instance alkyl, cycloalkyl, aryl, alkaryl or aralkyl, preferably containing not more than eight carbon atoms, or halogenated (e.g., brominated, chlorinated or fluorinated) derivatives thereof. Two of the hydrogen atoms of the aromatic hydrocarbon may be replaced by a divalent radical to yield, for example, compounds such as indene or coumarone. We prefer that the substituent contains no active hydrogen atoms since these may take may take part in reactions detrimental to the polymerization reaction. Examples of such substituents are —OH, —NH$_2$ and —COOH groups. N-aryl maleimides that we have found to be particularly suitable for use in our invention are N-phenyl maleimide and substituted derivatives thereof in which at least one of the aromatically bound hydrogen atoms has been substituted by a halogen atom, a nitro group, a nitrile group or an alkyl or alkoxy group containing from one to four carbon atoms.

Examples of our preferred aromatic and substituted aromatic radicals are phenyl, p-diphenyl, $\alpha$-naphthyl, $\beta$-naphthyl, o-, m- and p-tolyl, 2, 3, and 4-chlorophenyl, 4-bromophenyl, 2, 3 and 4-nitrophenyl, 2,4,5-trichlorophenyl, 2,4,6-tribromophenyl, 2, 3 and 4-t-butylphenyl, 2,4-dinitrophenyl, 4-benzylphenyl, 2 and 3-methoxyphenyl, 4-ethoxyphenyl, 4-phenoxyphenyl, 2-chloro-4-phenoxy methyl phenyl, 4-cyanophenyl and 2-methyl-4-chlorophenyl.

We further prefer that the substituent is not such as to increase the basicity of the imido nitrogen atom since the products obtained from polymerization of these monomers with vinyl chloride may suffer from reduced thermal stability. Examples of such substituents are halogen atoms and alkoxy groups. However, in some cases it is desirable to use N-(halogen substituted aryl) maleimides because they generally yield products of good color. In these circumstances, we prefer the bromo- or chloro-substituted derivatives because of their ready availability.

Where N-(substituted-phenyl) maleimides are used, we prefer those having a substituent in the 2-position on the phenyl radical, because the use of such compounds generally leads to polymeric products with a greater freedom from color than is possible with other substituted N-phenyl maleimides.

Examples of monomers which may provide units forming up to 49 percent by weight of the copolymer are ethylenically unsaturated hydrocarbons, (e.g., alkenes, dienes and aralkenes) and their halogenated derivatives; ethylenically unsaturated esters, e.g., esters of saturated alcohols and ethylenically unsaturated carboxylic acids and esters of ethylenically unsaturated alcohols and saturated carboxylic acids, ethylenically unsaturated ethers and anhydrides of ethylenically unsaturated acids. Specific examples include styrene, halogen-substituted styrenes, $\alpha$-alkyl (e.g., $\alpha$-methyl) styrene, unsaturated (e.g., vinyl or allyl) esters of fatty acids (particularly acetic acid), alkyl esters of acrylic acid (e.g., methyl, ethyl, n-butyl, 2-ethyl hexyl and octadecyl acrylate), alkyl esters of methacrylic acid (e.g., methyl methacrylate, butyl methacrylate, 2-ethyl hexyl and octadecyl methacrylate), alkenyl ethers such as the vinyl ethers of alcohols containing up to four carbon atoms, acrylonitrile, methacrylonitrile, vinylidene chloride, dialkyl esters of monoethylenically unsaturated dicarboxylic acids such as diethyl fumarate and dimethyl maleate, maleic anhydride, dienes such as butadiene, isoprene and divinyl benzene and other multi-ethylenically unsaturated compounds such as glycol dimethacrylate. The monomer is preferably one that has no adverse effects on the property of the copolymer.

Normally the reason for including such a third copolymerizable component is to modify the properties in some desirable manner, for example to improve the flow properties under conditions encountered during fabrication or to reduce residual color in the copolymer or to introduce unsaturated groups for later cross-linking. However, the addition of some of these monomers may decrease or destroy the improvement in softening point obtained by introducing the N-aryl maleimide. Where it is desired to retain the improvement in softening point, suitable comonomers are those whose homopolymers have a softening point at least equal to that of a polyvinyl chloride of comparable molecular weight. The softening points of the homopolymer and the polyvinyl chloride may be compared by any suitable test. For instance the 1/10th Vicat softening point or the Heat Distortion Temperature. Common examples of such monomers are vinylidene chloride, acrylonitrile, methyl methacrylate, styrene, α-methyl styrene, o-chlorostyrene and maleic anhydride. In other cases where increase in softening point is desired, it is generally preferred to exclude any third monomer.

The product may be prepared by any of the well-known polymerization processes used for vinyl chloride, i.e., in bulk, in solution, in aqueous emulsion or in aqueous suspension (e.g., by what is normally termed a granular process in vinyl chloride polymerization art). When using a solvent process the organic compound used as the solvent should not react with any of the monomers, and preferably should have little or no chain transfer effect on the polymerization reaction. Suitable solvents are hydrocarbons such as hexane, heptane, octane, benzene or toluene, alcohols such as methanol or ethanol, ethers such as diethyl ether or ketones such as acetone. Chlorinated hydrocarbons may also be used but tend to have a chain transfer effect on the polymeization. Examples are 1,1-dichloroethane, tetrachloroethane, methylene dichloride, chloroform and carbon tetrachloride.

The polymerization may be initiated by any suitable source of free radicals but is preferably effected in the presence of a free radical yielding catalyst active at the polymerization temperature.

Polymerization is preferably effected in aqueous medium as this affords ready dissipation of the heat of polymerization and avoids the use of expensive solvent recovery apparatus. Emulsion polymerization in aqueous medium is effected by reacting the ingredients dispersed in water in the presence of a water-soluble free radical catalyst, generally in the presence of a surface active agent. The surface active agent may be anionic (e.g., a salt of a long chain alkyl sulphonic acid), non-ionic (e.g. a water-soluble polymer such as polyethylene oxide) or cationic (e.g., a quaternary ammonium salt) and may be selected from those generally known for the polymerization of vinyl chloride. In granular polymerization, a dispersing agent (e.g., a protective colloid such as methyl cellulose or hydrolysed polyvinyl acetate) and a monomer-soluble catalyst are used. Temperatures normally used in the production of vinyl chloride (i.e., from about 25° to 80° C.) may be used for the polymerization and a very suitable temperature range is from 25° to 65° C. although higher or lower temperatures may be used if desired.

Suitable catalysts are selected from those normally used for the homopolymerization of vinyl chloride. In the case of granular polymerization examples include azo-nitriles such as αα'-azodi-isobutyronitrile and monomer-soluble peroxides such as lauroyl peroxide, benzoyl peroxide and other organic compounds containing the peroxide —O—O— linkage. In the case of emulsion polymerization, hydrogen peroxide or water-soluble salts of peroxy acids are normally used. An example is ammonium persulphate. We have found that the presence of the N-aryl maleimide may increase the reaction time and also decrease the molecular weight of the product. The former effect may be reduced by the choice of a more active catalyst and the latter may be avoided to some extent by reducing the polymerization temperature. If further increase in reaction time is not to be incurred by this remedy, it may be desirable in this case also to compensate this by the choice of a more active catalyst. Normally the amount of catalyst required to give useful results lies between 0.01 and 2 percent by weight of the polymerizable monomers.

In our preferred process, the water, catalyst, surface active agent (i.e., emulsifier or dispersing agent) and N-aryl maleimide are charged to a reaction vessel from which air is then removed, e.g. by purging with an inert gas, e.g., nitrogen, or by evacuation or both. The vinyl chloride is then charged to the vessel and the reactants brought to the reaction temperature to induce polymerization. Owing to differences in reactivity of vinyl chloride and N-aryl maleimides a simple batch reaction in which all the monomers are charged to the reaction vessel at the commencement of polymerization may give rise to heterogeneous products wherein the portion of the polymer formed at the beginning of the reaction tends to be enriched with the N-aryl maleimide at the expense of the portion of the polymer formed at the end of the reaction.

In some cases it is desirable to improve the homogeneity or uniformity of the polymer and this may be achieved by adding the desired amount of the N-aryl maleimide continuously or discontinuously, i.e., in increments throughout the reaction. In such a case, the compound is conveniently added as a solution in a suitable solvent or as a dispersion in water.

Instead of adding the N-aryl maleimide itself, a mixture of the N-aryl maleimide and vinyl chloride may be added continuously or discontinuously.

In order to achieve the optimum uniformity the rate of addition of the N-aryl maleimide or mixture of the N-aryl maleimide and vinyl chloride should be carefully controlled. One method of controlling the addition is by measuring the heat of polymerization during the reaction by isothermal or adiabatic calorimetry and adding the monomer pro rata as heat is produced. The amount of heat produced can provide an accurate indication of the amount of polymer formed and hence the amounts of the monomers utilized.

In principle the total amount of heat produced per gram of polymer formed can be calculated from the heats of copolymerisation of the monomers or approximately from their heats of homopolymerization. Thus the amount of heat produced for complete polymerization can be foretold in any particular case. Likewise the total amount of monomer to be added for a 100 percent yield of a polymeric product of the desired composition can be calculated in advance, and hence also the amount of monomer to be added to correspond linearly with a measured amount of heat. In practice, however, it is usually convenient to calibrate the reaction system empirically, in terms of the relative amounts of monomers and heat, to give uniform polymeric products of a particular composition. In this way, also, any incidental losses of heat from the system are allowed for, which would be troublesome if reliance were placed solely on values calculated from heats of copolymerization.

The composition of the copolymer produced depends very closely on the concentration of monomers in the polymerizing mixture, and this is reflected in the amount of each monomer needed in the initial charge. This can be calculated approximately or determined empirically.

Where a third monomer such as acrylonitrile or styrene is polymerized with the vinyl chloride and the N-aryl maleimide the additional monomer can form part of the initial charge or can be metered in to the reaction vessel in a like manner during the reaction.

Where such steps are not taken to obtain a homogenous polymeric product and all the monomers are charged to the reaction vessel initially, since the amount of N-aryl maleimide found in the polymer is generally greater than that expected from the monomer composition, it may be necessary to add the N-aryl maleimide in a quantity somewhat below that required in the polymeric product. A reduction of up to about 5 to 10 percent by weight is usually adequate although a greater reduction may be required in some circumstances.

After polymerization, the polymeric product may be separated from the reaction liquor in any suitable way such as, for example, by filtration or centrifugation, by heat or by a combination of these methods. The product may then be purified, e.g., by washing with a suitable preferential solvent such as water, an ether or an alcohol. Finally, it may be dried, e.g., in a fluidized bed or by spray drying or by drying in an oven.

Ancillary ingredients may be added to the product and examples of such ingredients include fillers (e.g. glass fibers), pigments, heat and light stabilizers, plasticizers, lubricants and mould release agents. The copolymers may also be blended with other polymeric material, e.g., thermoplastics such as polyvinyl chloride or synthetic rubbers such as those derived from butadiene.

As those products containing 60 percent or more by weight of vinyl chloride residues possess, in general, most of the properties normally associated with polyvinyl chloride they may be used with effect in any application where a polyvinyl chloride would be used. Our preferred products may be used additionally in many applications debarred to the polyvinyl chloride because of its poor dimensional stability at elevated temperatures. Thus, our materials are particularly useful in the fabrication of rigid mouldings by any of the fabrication procedures used for thermoplastic materials such as extrusion, injection-, compression- or transfer-moulding. Those polymers having reduced viscosities (measured on a solution of 0.5 g. of polymer in 100 ml. of dimethylformamide at 25° C.) of at least 0.3 are particularly suitable for such applications.

The shaped articles formed from many of the polymeric products may be subjected to elevated temperatures normally above the softening points of homopolymers of vinyl chloride. Uses include pipes and joints for use in hot water plumbing. Other applications will readily come to the mind of a polymer fabricator.

The invention is illustrated by the following Examples in which all parts are expressed as parts by weight. In all the Examples, reduced viscosities were measured on solutions of 0.5 gm. of polymer in 100 mls. of dimethyl formamide at 25° C., unless otherwise indicated.

EXAMPLE 1

One hundred parts of vinyl chloride were dispersed in 200 parts of water using 0.5 part of partially hydrolysed polyvinyl acetate as the dispersing agent. One part of lauroyl peroxide was added as catalyst and the dispersion was agitated under an atmosphere of nitrogen at 100 – 200 lbs/sq. in. and at a temperature of 45° C. for 66 hours. The resulting slurry of polymer in water was centrifuged to separate the solid product which was then washed thoroughly with water and dried under vacuum. The yield was 98 parts of polyvinyl chloride having a reduced viscosity of 1.2 and 1/10th and 10/10th Vicat softening points of 76° and 103° C. as measured on a sample stabilized with 2 percent by weight of a commercially available organo-tin stabilizer and pressed from the polymer without any preliminary working up.

The polymerization was repeated using 90 parts of vinyl chloride and 10 parts of N-phenyl maleimide. The yield of product after 66 hours reaction at 45° C. followed by separation, purification and drying was about 100 percent theoretical. It was in the form of near-white granules and had a reduced viscosity of 0.94. The product was mixed with 2 percent by weight of a commercially available organo-tin stabilizer by adding a solution of the stabilizer and evaporating the solvent, and moulding at 170° C. to give very pale brown discs having a 1/10th Vicat softening point, measured under the same conditions as that of the homopolymer of vinyl chloride, of 79.5° C., 3.5° C. higher than polyvinyl chloride. The 10/10th Vicat softening point was 113° C.

Analysis of the copolymer by chlorine content showed it to contain 89 percent by weight of vinyl chloride units and 11 percent by weight of N-phenyl maleimide units.

EXAMPLE 2

The process of Example 1 was repeated using 80 parts of vinyl chloride and 20 parts of N-phenyl maleimide and after 46 hours polymerization and subsequent separation, purification and drying, 95.2 parts of polymeric product were obtained in the form of off-white granules and had a reduced viscosity of 0.80.

After blending with a 2 percent by weight commercially available organo-tin stabilizer in the manner described in Example 1, the product was moulded at 170° C. to give pale brown discs having 1/10th and 10/10th Vicat softening points, measured as in Example 1, of 103° C. (27° C. higher than polyvinyl chloride) and 121.5° C.

Analysis of the product by chlorine content showed it to contain 78.5 percent by weight of vinyl chloride units and 21.5 percent by weight of N-phenyl maleimide.

By way of comparison, the process was repeated using 20 parts of N-benzyl maleimide, 80 parts of vinyl chloride, 285 parts of water, one part of lauroyl peroxide and 0.7 part of partially hydrolysed polyvinyl acetate. The polymerization was effected at 45° C. for 29 hours and the product was filtered, washed with water and dried thoroughly to yield 45.5 parts of polymeric material containing 26.2 percent by weight of N-benzyl maleimide by nitrogen analysis. The product was blended with stabilizer as in Example 1 and compression moulded to give discs having a 1/10th Vicat softening point of only 73° C. (less than that of polyvinyl chloride) and was also found to be insoluble in all common solvents.

In a further comparative experiment, 80 parts of vinyl chloride were polymerized with 20 parts of maleimide in 200 parts of water and in the presence of one part of lauroyl peroxide and 0.5 part of partially hydrolysed polyvinyl acetate. The polymerization was effected at 45° C. for 17 hours and the product filtered, washed and dried to yield 56.2 parts of polymeric material having a reduced viscosity of 0.7 and containing 44.7 percent by weight of maleimide. Compression moulded discs of the stabilized polymer had a 1/10th Vicat softening point of only 61.8° C. and were notably unstable. After a few days, the container in which samples were stored showed signs of corrosion by hydrogen chloride. Furthermore, after immersion at 55 ° – 60° C. the product was found to be considerably more sensitive to water than polyvinyl chloride. This is illustrated in Table below.

| Polymer | % increase in weight water at 55°–60° C. after immersion in for times stated | | | |
| --- | --- | --- | --- | --- |
| | 21 hours | 45 hours | 69 hours | 141 hours |
| Polyvinyl chloride | 0.121 | 0.336 | 0.511 | 0.914 |
| Vinyl chloride/ maleimide | 6.29 | 5.32 | 4.24 | 3.77 |

The reduction in weight after the initial increase indicates that the vinyl chloride/maleimide polymerization product may be dissolving.

EXAMPLE 3

The process of Example 1 was repeated using 30 parts of N-phenyl maleimide, 70 parts of vinyl chloride and a temperature of 40° C. to yield 68 parts of pale yellow granules having a reduced viscosity of 0.87. The product was mixed with 2 percent by weight of a commercially available organo-tin stabilizer and pressed at 170° C. to yield brown opaque discs having 1/10th and 10/10th Vicat softening points of 130° and 147° C. Analysis showed it to contain 63 percent by weight of vinyl chloride and 37 percent by weight of N-phenyl maleimide. A comparison of the product of this Example with those of Examples 1 and 2 is shown in the Table below.

| % by weight of N-phenyl maleimide in product | Reduced Viscosity | Vicat Softening Points | |
| --- | --- | --- | --- |
| | | 1/10 | 10/10 |
| 0 | 1.2 | 76 | 103 |
| 11 | 0.94 | 79.5 | 113 |

| 21.5 | 0.8 | 103 | 121.5 |
| 37 | 0.87 | 130 | 147 |

It is notable that the Vicat softening points show a steady increase with increase in N-aryl maleimide content while the molecular weights (as shown by reduced viscosity) decrease. This decrease has been offset to some extent in Example 3 by reducing the polymerization temperature.

EXAMPLE 4

A series of granular polymerizations of vinyl chloride and N-phenyl maleimide were effected to 50° C. in a stirred autoclave holding 4,000 parts of water containing eight parts of lauroyl peroxide as catalyst and 10 parts of partially hydrolyzed polyvinyl acetate as dispersing agent. In each case, all the ingredients except the vinyl chloride were charged to the vessel which was then evacuated slowly, purged twice with nitrogen and then evacuated again prior to charging the vinyl chloride. Monomers were used in amounts to total 2,000 parts in each case.

After separation, washing and drying, the products were milled with 1 percent by weight of dibasic lead stearate on a two-roll mill and then compression moulded at 215° C. into specimens whose Vicat softening points were tested. The Fikentscher K-value of each product was recorded to give an indication of molecular weight. The K-value was calculated from viscosity measurements on solutions of 0.25 gm. of polymer in 50 mls. of ethylene dichloride at 25° C. On some of the specimens, Macklow-Smith flow pressures were obtained, indicating the ease of moulding of the products. Increase in flow pressure indicates a reduction in the ease of moulding.

The general decrease in molecular weight and increase in Macklow-Smith flow pressure with increase in N-aryl maleimide content may be noted. The apparent reduction in 1/10th Vicat softening point is thought to be due to the milling conditions used before pressing. The figures are not a true indication of the temperature at which the product becomes plastic since during compounding it was noticed that with increase in N-aryl maleimide content, the product became more difficult to gel under the conditions normally used for polyvinyl chloride. In fact, for Experiment E, the milling temperature had to be raised to 170° C. before a satisfactory crepe could be obtained. This indicates that the true softening point of the product in fact increases with increase in N-aryl maleimide content.

EXAMPLE 5

A further series of granular polymerizations of vinyl chloride with N-phenyl maleimide were effected at 60° C. using lauroyl peroxide as catalyst and partially hydrolyzed polyvinyl acetate as dispersing agent. In most cases the monomer charge totalled 2,000 parts and 4,000 parts of water were used. However, in Example F, the water charge was 2,000 parts and the monomer charge 1,000 parts.

During milling, the product was blended with 1 percent by weight of dibasic lead stearate and for the Vicat test samples were compression moulded at 215°C.

Again it is notable that while the increase in 1/10th Vicat softening point is very small, the difficulty of milling the material as the N-aryl maleimide content increased indicated that the temperature at which the material becomes plastic had increased considerably, especially for those materials containing 30 percent by weight or more of N-aryl maleimide.

EXAMPLE 6

A further series of granular polymerizations of vinyl chloride and N-phenyl maleimide were effected at 70° C. using 4,000 parts of water, 2,000 parts of monomer in total, 2 parts of lauroyl peroxide and 5 parts of dispersing agent. The conditions and results are set out below.

| Experiment | A | B | C | D | E |
|---|---|---|---|---|---|
| N-phenyl maleimide in charge (percent by weight) | 0 | 5 | 10 | 20 | 30 |
| N-phenyl maleimide in product (percent by weight) | 0 | 8.7 | 9.6 | 20.7 | ~33 |
| Colour of product | White | White | Pale buff | Pale buff | Very pale buff |
| Macklow-Smith flow pressure (lb./sq. inch) at 150° C. | 3,330 | Not measured | 4,030 | >4,400 | Not measured |
| K-value | 65.7 | 61.8 | 64.5 | 60.8 | 51.0 |
| Milling conditions (temperature and time) | 150° C. for 10 mins. followed by 125° C. for 5 mins. | 150° c. for 10 mins. followed by 150° C. for 2 mins. | 150° C. for 10 mins. and 125° C. for 5 mins. | As for C | 170° C. for 10 mins. |
| 1/10 Vicat softening point (° C.) | 83 | 80.5 | 81 | 80 | 79 |

*The product would not gel at 125° C.

| Experiment | F | G | H | J | K | L | M | N |
|---|---|---|---|---|---|---|---|---|
| Catalyst (parts by weight) | 2 | 2 | 8 | 2 | 2 | 8 | 20 | 8 |
| Dispersing agent (parts by weight) | 5 | 5 | 10 | 5 | 5 | 10 | 10 | 10 |
| N-phenyl maleimide in charge (percent by weight) | 0 | 5 | 5 | 10 | 20 | 30 | 45 | 60 |
| N-phenyl maleimide in product (percent by weight) | 0 | 5.3 | 6.3 | 10.2 | 21.1 | 33.3 | 45.6 | Not measured |
| Colour of product | White | Pale buff | Very pale buff | Pale buff | Pale buff | Very pale buff | Dark buff | Yellow |
| Macklow-Smith flow pressure (lb./sq. in.) at 150° C. | 3,490 | 3,610 | Not measured | >4,400 | Not measured | 4,070 | Not measured | Not measured |
| K-value | 55.7 | 54.7 | 43.2 | 53.2 | 49.6 | 43.0 | 36.8 | 28.8 |
| Milling conditions | As for A | As for A | As for A | As for A | As for A | 170° C. for 10 mins. | 180° C.* | 180° C.* |
| 1/10 Vicat softening point | 79 | 81.5 | 77 | 83.5 | 83 | 80 | Not measured | Not measured |
| Tensile yield stress (lb./sq. inch) | 9,330 | 9,650 | Not measured | 9,970 | 10,600 | Not measured | do | Do |

*The product would not gel at this temperature.

| Experiment | P | Q | R |
|---|---|---|---|
| N-phenyl maleimide in charge (parts by weight) | 0 | 10 | 20 |
| N-phenyl maleimide in product (parts by weight) | 0 | 9.7 | 28.8 |
| Macklow-Smith flow pressure lb./sq. in. at 150° C. | 3290 | 3520 | 3870 |
| K-value | 47.8 | 47.8 | 44.8 |
| Milling conditions* | as for A | as for A | as for A |
| 1/10th Vicat Softening point | 79 | 80 | 81 |

*During milling, the product was blended with 1 % by weight of dibasic lead stearate.
Measured on samples compression moulded at 215° C.

EXAMPLE 7

An autoclave was charged with 3,500 parts of distilled water, eight parts of lauroyl peroxide, 10 parts of partially hydrolyzed polyvinyl acetate and 200 parts of N-phenyl maleimide as a solution having a strength of 40 gm./100 mls. in ethylene dichloride. The vessel was then evacuated, purged twice with nitrogen, evacuated again and charged with 1,800 parts of vinyl chloride and polymerization was effected at 60° C, to yield 1728 parts of off-white product.

EXAMPLE 8

An autoclave was charged with 2,000 parts of water, six parts of ammonium persulphate, 3.33 parts of a salt of an organic sulphonate as an anionic emulsifying agent and 400 parts of N-phenyl maleimide. After evacuation and purging, the vessel was then charged with 1,600 parts of vinyl chloride and the temperature brought to 50° C. After eight hours, the polymerization was completed and after separation, purification and drying, 1,610 parts of an off-white product were obtained.

EXAMPLE 9

The process of Example 5K was repeated using eight parts of lauroyl peroxide, 10 parts of dispersing agent and N-o-chlorophenyl maleimide in place of N-phenyl maleimide. 1,655 parts of a white product were obtained having a Fikentscher K-value of 49.6. After milling at 150° C. for 10 minutes, it was pressed to yield a sample having a 1/10th Vicat softening point of 83° C.

EXAMPLE 10

A vessel was charged with 200 parts of water containing one part of lauroyl peroxide, 0.5 part of partially hydrolyzed polyvinyl acetate and 20 parts of N-o-chlorophenyl maleimide. The vessel was then pressurized with $N_2$ and vented three times to remove any dissolved air. Eighty parts of vinyl chloride were then added and the pressure made up to 120 lb./sq. in. with nitrogen. The mixture was shaken at 45° C. for 24 hours. The product was filtered off, washed well with hot water followed by ethanol and then dried in vacuum at 70°– 75° C. to yield 67 parts having a reduced viscosity of 1.08. The product contained 22.3 weight percent N-o-chlorophenyl maleimide based on nitrogen analysis. After mixing it with 2 percent by weight of stabilizer in the manner described in Example 1, it could be compression moulded into discs with 1/10th and 10/10th Vicat softening points of 89 and 136.6° C.

EXAMPLE 11

The process of Example 10 was repeated using N-o-tolyl maleimide in place of N-o-chlorophenyl maleimide and the polymerization was effected at 45° C. for 23 hours. The product was worked up as described in Example 10 to yield 55.3 parts of polymeric material having a reduced viscosity of 1.02 and containing 62.5 weight percent vinyl chloride based on chlorine analysis. In this and all the following Examples, the polymer was blended with 2 percent by weight of an organo-tin stabilizer in the manner described in Example 1 and discs were compression moulded from the blend. In this case the compression moulded discs had 1/10th and 10/10th Vicat softening points of 73.4 and 153.2° C.

EXAMPLE 12

The process of Example 10 was repeated using N-m-methoxyphenyl maleimide in place of N-o-chlorophenyl maleimide. The polymerization was effected at 45° C. for 24 hours. The polymer was worked up as described in Example 10 to yield 38 parts of polymeric product containing 45.8 weight percent vinyl chloride based on chlorine analysis. Compression moulded discs had 1/10th and 10/10th Vicat softening points of 96.8° and 120.6° C.

EXAMPLE 13

The process of Example 10 was repeated using 20 parts of N-phenyl maleimide, 70 parts of vinyl chloride and 10 parts of styrene. Polymerization was effected at 45° C. for 24 hours. The polymer was worked up as described previously to yield 32.5 parts of product having a reduced viscosity of 2.14. Compression molded discs had 1/10th and 10/10th Vicat softening points of 181° and 190° C. The product contained 7.2 percent by weight of chlorine; that is, 12.7 percent by weight of vinyl chloride. Nitrogen analysis (4.6 percent by weight) indicated that the amount of N-phenyl maleimide present was 56.8 percent by weight.

EXAMPLE 14

The process of Example 13 was repeated using 10 parts of acrylonitrile in place of the styrene. Polymerization was effected at 55° C. and 138 lb./sq. in. for 18½ hours. The polymer was worked up as described previously to yield 48 parts of product having a reduced viscosity of 1.0. Compression mouldings had 1/10th and 10/10th Vicat softening points of 113.8° and 157.5° C. The product was found to contain 22.0 percent by weight of chlorine, indicating the presence of 38.7 percent by weight of vinyl chloride. An oxygen analysis of 8.8 percent by weight indicated the presence of 47.6 percent by weight of N-phenyl maleimide.

EXAMPLE 15

Example 13 was repeated using 10 parts of vinyl ethyl ether in place of the styrene. Polymerization was effected at 55° C. for 19 hours. The polymer was worked up as described above to yield 76.4 parts of product having a reduced viscosity of 0.64. compression mouldings had 1/10th and 10/10th Vicat softening points of 75.8 and 118.2° C. The product contained 37 percent by weight of chlorine, indicating the presence of 65.3 percent by weight of vinyl chloride. Nitrogen analysis (2.1 percent by weight) indicated the presence of 26 percent by weight of N-phenyl maleimide.

EXAMPLE 16

The process of Example 10 was repeated using 75 parts of vinyl chloride, 20 parts of N-phenyl maleimide and 5 parts of butadiene. Polymerization was effected at 55° C. for 19 hours. The yield was 21.5 parts of a rubbery product compression mouldings of which showed 1/10th and 10/10th Vicat softening points of 64.2° and 72.2° C. The product was found to contain 15.8 percent by weight of chlorine, equivalent to 27.8 percent by weight of vinyl chloride. Nitrogen analysis (4.5 percent by weight) indicated the presence of 55.6 percent by weight of N-phenyl maleimide. The product was insoluble in common solvents.

EXAMPLE 17

A vessel was charged with 160 parts of methanol, 10 parts of N-phenyl maleimide and one part of lauroyl peroxide. The vessel was then pressurized to 100 lb./sq. inch with nitrogen and vented three times and 90 parts of vinyl chloride added. The mixture was shaken at 50° C. and 135 lb./sq. inch for 3 days after which the product was filtered off, washed well with methanol and dried in vacuo at 60° C. to yield 73.8 parts of polymeric material having a reduced viscosity of 0.38 and containing 85 weight percent vinyl chloride. Compression mouldings showed 1/10th and 10/10th Vicat softening points of 70.8° and 100° C. These low readings were thought to be due to the low molecular weight of the product.

EXAMPLE 18

The process of Example 17 was repeated with 10 parts of N-phenyl maleimide, 90 parts of vinyl chloride, 240 parts of methanol and one part of acetyl cyclohexyl sulphonyl peroxide. The mixture was shaken at 25° C. for 3 days and the solids isolated to yield 73 parts of polymeric product having a reduced viscosity of 0.4 and containing 86.8 weight percent vinyl chloride based on chlorine analysis.

EXAMPLE 19

The process of Example 13 was repeated using 10 parts of α-methyl styrene in place of the styrene. Polymerization was effected at 55° C. for 21 hours to yield 30.8 parts of polymeric product with a reduced viscosity of 0.39. Compression mouldings had 1/10th and 10/10th Vicat softening points of 189.5° and 198.7° C. Chlorine and nitrogen contents indicated that the product contained 9.7 percent by weight of vinyl chloride and 54.4 percent by weight of N-phenyl maleimide.

EXAMPLE 20

The process of Example 10 was repeated using 80 parts of vinyl chloride and 20 parts of N-α-naphthyl maleimide. Polymerization was effected at 55° C. for 20 horus to yield 12.5 parts of polymeric product which was insoluble in common organic solvents. Compression mouldings showed 1/10th and 10/10th Vicat softening points of 187.7° and 207.8° C. The product was found to contain 19 percent by weight of vinyl chloride based on chlorine analysis.

EXAMPLE 21

4.5 parts of N-phenyl maleimide, 0.5 part of vinyl chloride, 17.5 parts of benzene and 0.05 part of acetyl cyclohexyl sulphonyl peroxide were maintained at 30° C. in a degassed sealed tube for 20 hours. The resulting product was filtered off, washed with 200 parts of methyl alcohol and dried in vacuum at 75° C. to yield 3.6 parts of polymeric material having a reduced viscosity of 0.32 and containing 9.2 percent by weight of vinyl chloride, based on chlorine analysis.

EXAMPLE 22

The process of Example 2 was repeated but in this case, the N-phenyl maleimide was added in eight portions at half-hourly intervals during the polymerization in the form of dispersion in water. The yield was 48.5 parts of a product having a reduced viscosity of 0.78. A portion was mixed with 2 percent by weight of an organo-tin stabilizer and compression moulded at 200° C. to yield brown, opaque samples having 1/10th and 10/10th Vicat softening points of 114° – 120° C. and 139° – 143° C., respectively. Chlorine analysis indicated a vinyl chloride content of 60 percent by weight.

The method of adding a comonomer such as an N-aryl maleimide incrementally during the course of the reaction pro rata as heat is produced is the subject of U.S. Application of Brian Norman Hendy being filed concurrently herewith being a continuation-in-part of application Ser. Nos. 765,426 filed on Oct. 7, 1968, now abandoned and of 756,014 filed on Aug. 28, 1968, now abandoned.

We claim:

1. A moldable thermoplastic solid polymeric product having a softening point greater than polyvinyl chloride containing units produced by polymerization of vinyl chloride and an N-substituted maleimide by free radical catalysis characterized in that said polymeric product comprises from 99 to 60 percent by weight of vinyl chloride units from 1 to 40 percent by weight of N-aryl maleimide units and from 0 to 20 percent by weight of units of at least one other ethylenically unsaturated compound copolymerisable with both vinyl chloride and the N-aryl maleimide, the percentages totalling 100 percent, said polymeric product having a reduced viscosity measured on a solution of 0.5 g polymeric product in 100 mls of dimethylformamide at 25° C. of at least 0.3.

2. A solid polymeric product as claimed in claim 1, characterized in that said polymeric product comprises from 90 to 70 percent by weight of vinyl chloride units, 10 to 30 percent by weight of said N-aryl maleimide units and from 0 to 20 percent by weight of units of said other ethylenically unsaturated compound, the percentages totalling 100 percent.

3. A solid polymeric product as claimed in claim 1, characterized in that said ethylenically unsaturated compound is one whose homopolymer has a softening point at least as high as that of a homopolymer of vinyl chloride of comparable molecular weight.

4. A solid polymeric product as claimed in claim 1, characterized in that the N-aryl maleimide is an N-(2-substituted phenyl) maleimide.

5. A solid polymeric product as claimed in claim 1, characterized in that the N-aryl maleimide is a chloro- or bromo-substituted N-phenyl maleimide or is N-o-tolyl maleimide or N-m-methoxyphenyl maleimide.

6. A solid polymeric product of vinyl chloride and a N-substituted maleimide which consists essentially of from 99 to 1 percent by weight of vinyl chloride units and from 1 to 99 percent by weight of units of N-phenyl maleimide, N-o-chlorophenyl maleimide, N-o-tolyl maleimide, N-m-methoxyphenyl maleimide or N-α-naphthyl maleimide.

7. A solid polymeric product as claimed in claim 1, characterized in that said polymeric product is a copolymer of (i) vinyl chloride, (ii) N-phenyl maleimide and (iii) styrene, acrylonitrile, α-methyl-styrene, vinyl ethyl ether or butadiene.

* * * * *